United States Patent
Ogawa et al.

(10) Patent No.: US 10,800,613 B2
(45) Date of Patent: Oct. 13, 2020

(54) CONVEYANCE SYSTEM AND CONVEYANCE METHOD

(71) Applicant: Zensho Holdings Co., Ltd., Tokyo (JP)

(72) Inventors: Kentaro Ogawa, Tokyo (JP); Hiroto Hata, Tokyo (JP); Masanori Shioya, Tokyo (JP); Tatsuya Ikenoue, Tokyo (JP)

(73) Assignee: Zensho Holdings Co., Ltd., Tokyo (JP)

( * ) Notice: Subject to any disclaimer, the term of this patent is extended or adjusted under 35 U.S.C. 154(b) by 0 days.

(21) Appl. No.: 16/493,793

(22) PCT Filed: Mar. 13, 2018

(86) PCT No.: PCT/JP2018/009823
§ 371 (c)(1),
(2) Date: Sep. 13, 2019

(87) PCT Pub. No.: WO2018/168885
PCT Pub. Date: Sep. 20, 2018

(65) Prior Publication Data
US 2020/0031592 A1    Jan. 30, 2020

(30) Foreign Application Priority Data

Mar. 14, 2017 (JP) .................. 2017-048523

(51) Int. Cl.
*B65G 47/52* (2006.01)
*A47G 23/08* (2006.01)
(Continued)

(52) U.S. Cl.
CPC ............ *B65G 47/52* (2013.01); *A47G 23/08* (2013.01); *B65G 15/22* (2013.01); *B65G 37/00* (2013.01); *B65G 2201/0202* (2013.01)

(58) Field of Classification Search
CPC ............ B65G 2201/0202; B65G 37/00; B65G 15/22; B65G 47/52; B65G 13/08;
(Continued)

(56) References Cited

U.S. PATENT DOCUMENTS

| 6,930,296 B2 * | 8/2005 | Chen ................... A21B 3/07 99/486 |
| 2005/0256774 A1 * | 11/2005 | Clothier ............... B65G 54/02 705/15 |

(Continued)

FOREIGN PATENT DOCUMENTS

| CN | 101467837 A | 7/2009 |
| CN | 101480311 A | 7/2009 |

(Continued)

OTHER PUBLICATIONS

The First Office Action dated Jul. 3, 2020, of counterpart Chinese Application No. 201880017368.5, along with an English translation.

(Continued)

*Primary Examiner* — James R Bidwell
(74) *Attorney, Agent, or Firm* — DLA Piper LLP (US)

(57) ABSTRACT

A conveyance system conveys an article arranged by a user to a customer. The conveyance system includes a first conveyance unit for conveying the article arranged by the user, a second conveyance unit that is connected to the first conveyance unit and that is configured to convey the article conveyed from the first conveyance unit, and, when the user newly arranges a new article, is capable of conveying the article, a third conveyance unit that is connected to the second conveyance unit and is configured to convey the article conveyed by the second conveyance unit to the customer, and a control unit that is configured to perform conveyance control of each of the first conveyance unit, the (Continued)

second conveyance unit, and the third conveyance unit, and convey the article to the customer.

10 Claims, 16 Drawing Sheets

(51) Int. Cl.
    *B65G 15/22* (2006.01)
    *B65G 37/00* (2006.01)

(58) Field of Classification Search
    CPC ........ B65G 15/24; A47G 23/08; A47B 83/02;
                            A47F 10/06; G06F 17/60
    USPC .......................................................... 198/580
    See application file for complete search history.

(56) References Cited

U.S. PATENT DOCUMENTS

| | | | | |
|---|---|---|---|---|
| 2009/0014279 A1* | 1/2009 | Bouetard | ............... | B65G 15/00 198/358 |
| 2010/0270123 A1* | 10/2010 | Ishino | ..................... | A47F 10/06 198/465.1 |
| 2012/0186950 A1* | 7/2012 | Ishino | ..................... | A47F 10/06 198/850 |
| 2012/0325624 A1* | 12/2012 | Tanaka | .................... | A47G 23/08 198/465.1 |
| 2019/0202069 A1* | 7/2019 | Bando | ..................... | B25J 15/08 |

FOREIGN PATENT DOCUMENTS

| | | |
|---|---|---|
| CN | 103584663 A | 2/2014 |
| CN | 106429364 A | 2/2017 |
| JP | 2002-136414 A | 5/2002 |
| JP | 2002-219043 A | 8/2002 |
| JP | 2002-223925 A | 8/2002 |
| JP | 2003-12125 A | 1/2003 |
| JP | 2006-289547 A | 10/2006 |
| JP | 2009-149437 A | 7/2009 |
| JP | 2010-37064 A | 2/2010 |
| JP | 2011-289 A | 1/2011 |
| JP | 2016-147019 A | 8/2016 |

OTHER PUBLICATIONS

Office Action dated Jun. 2, 2020, of counterpart Singaporean Application No. 11201908405Y.

* cited by examiner

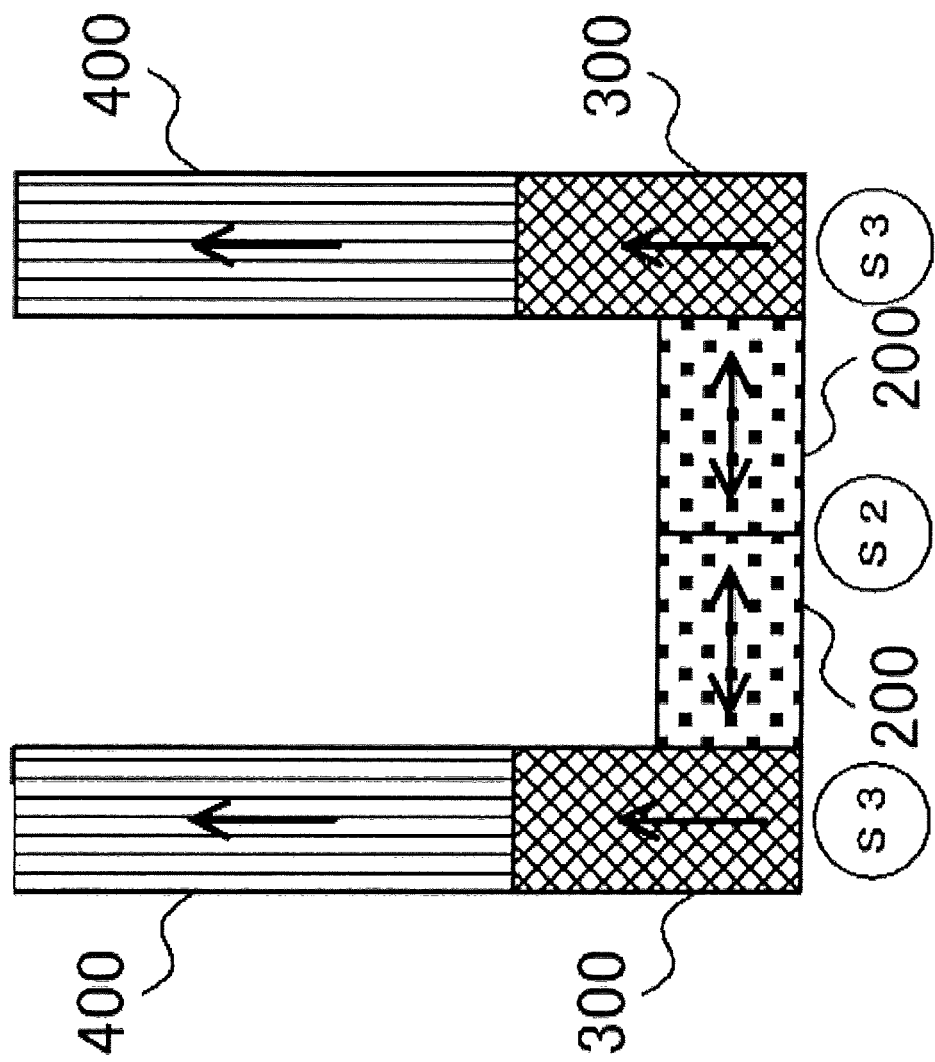

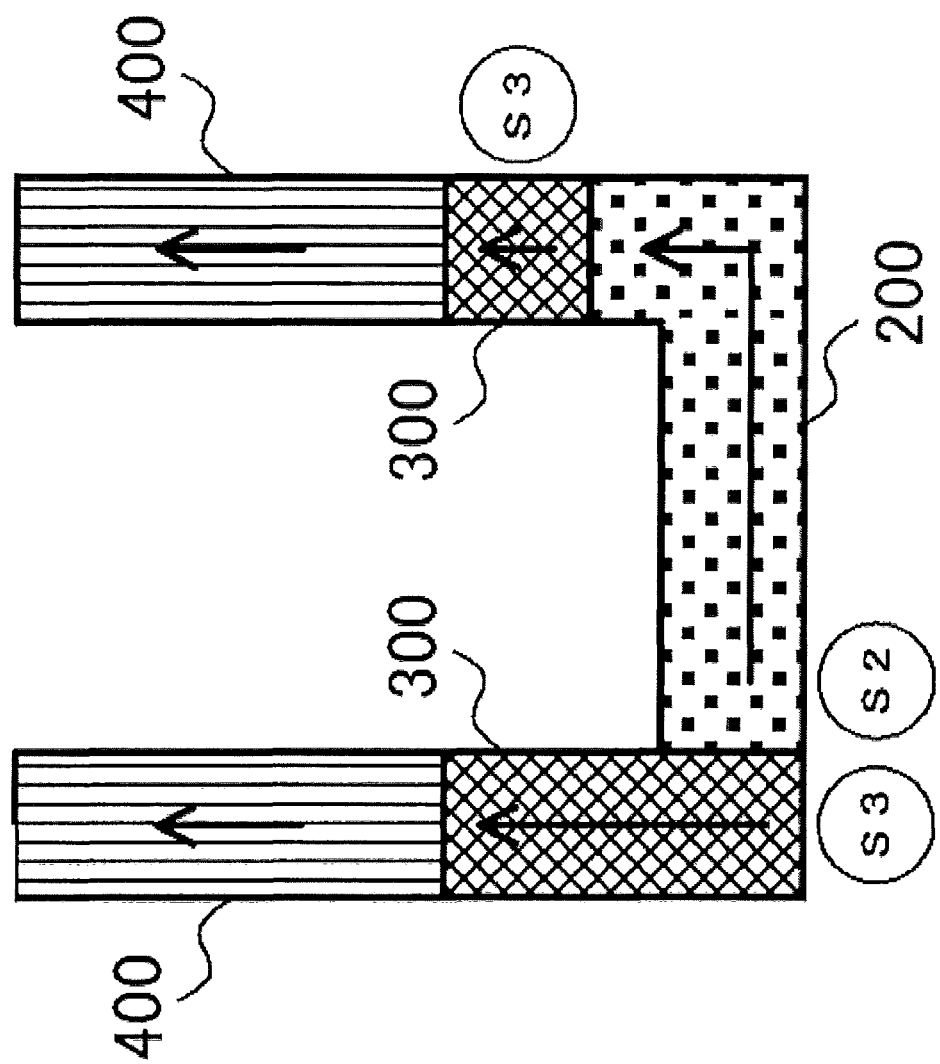

CONVEYANCE SYSTEM AND CONVEYANCE METHOD

TECHNICAL FIELD

This disclosure relates to a conveyance system and a conveyance method, more particularly, to a conveyance system and a conveyance method in which a plurality of conveyance units are arranged.

BACKGROUND

Conventionally, there has been existing a conveyance device related to articles such as a conveyor belt of a sushi-go-round that can be freely selected by customers without ordering from a store clerk, and can freely select desired articles that are conveyed to the customers at their favorite timing.

For example, as various types of articles are conveyed to their seats, customers can freely select and order their favorite articles at their favorite timing without calling a sales clerk and ordering. In addition, it is possible for the store clerk to save labor for going to the customers' seat to ask for an order or bringing the ordered food to the customers' seat.

Japanese Unexamined Patent Application Publication No. 2005-289547 discloses an E-type circulating food and drink conveyance device in which a conveyance passage is divided into two passages, i.e., an E-type leading side conveyance passage and an E-type basic side conveyance passage to form separate circulation passages and driven as separate circulation passages, and one circulation passage obtained by integrating the E-type leading side conveyance passage with the E-type basic side conveyance passage and a circulation passage consisting of only the E-type basic side conveyance passage can be selectively switched.

Furthermore, Japanese Unexamined Patent Application Publication No. 2011-000289 discloses a food circulation device provided with a sub-conveyance device that conveys individually ordered articles to a customer who ordered the articles, separately from a main circulating device that provides foods by circulating endless chains, and including a driving unit that continuously circulates a band member and a guide unit to guide a food container to a target location by blocking the movement of the food container placed on the band member and conveyed.

However, in JP '289, for example, there is one place for carrying in the sub-conveyance device for conveying to seats in a right-side area when viewed from a kitchen area, and there is no problem when there are few orders. However, when orders are crowded, delivery of the ordered articles is delayed and it is not possible to quickly convey the ordered articles to customers. In addition, it is necessary to assign personnel to the sub-conveyance devices at the both of the right and left sides, and usability has not been sufficiently considered.

Therefore, it could be helpful to provide a conveyance system and a conveyance method that is easy to use in a conveyance system and a conveyance method for conveying an article to a customer.

SUMMARY

We thus provide:

A conveyance system conveys an article arranged by a user to a customer and may include a first conveyance unit for conveying the article arranged by the user, a second conveyance unit that is connected to the first conveyance unit and that is configured to convey the article conveyed from the first conveyance unit, and, when the user newly arranges a new article, is capable of conveying the article; a third conveyance unit that is connected to the second conveyance unit and is configured to convey the article conveyed by the second conveyance unit to the customer, and a control unit that is configured to perform conveyance control of each of the first conveyance unit, the second conveyance unit, and the third conveyance unit, and convey the article to the customer.

Both of the second conveyance unit and the third conveyance unit are provided in a plural form, and the first conveyance unit is configured to convey the arranged article to any one conveyance unit included in the second conveyance unit based on instruction information transmitted from the control unit.

The first conveyance unit is provided in a plural form, and conveys the arranged article to a different conveyance unit included in the second conveyance unit based on the instruction information transmitted from the control unit.

The conveyance system further includes an acquiring unit that is configured to acquire conveyance information on a conveyance location of the arranged article, in which the control unit is configured to control any one of the first conveyance unit, the second conveyance unit and the third conveyance unit based on the conveyance information.

The conveyance system further includes a guide unit that is configured to change the conveyance location of the conveyed article at a point where the first conveyance unit and the second conveyance unit are connected to each other based on the instruction information transmitted from the control unit.

The conveyance system further includes an input unit that is configured to receive input information of the article to be conveyed to the customer, in which the control unit is configured to control at least one of the first conveyance unit, the second conveyance unit and the third conveyance unit based on the input information.

A conveyance method conveys an article arranged by a user to a customer and may include a first conveyance step of conveying an article arranged by a user, a second conveyance step in which the article conveyed in the first conveyance step is conveyed or a new article arranged by the user is conveyed, a third conveyance step in which the article conveyed in the second conveyance step is conveyed to the customer, and a control step in which conveyance control of each of the first conveyance step, the second conveyance step, and the third conveyance step is performed to convey the article to the customer.

A conveyance device conveys an article arranged by a user to a customer, and the conveyance device may include a first conveyance unit for conveying the article arranged by the user, a second conveyance unit that is connected to the first conveyance unit and that is configured to convey the article conveyed from the first conveyance unit, and, when the user newly arranges a new article, is capable of conveying the article, a third conveyance unit that is connected to the second conveyance unit and is configured to convey the article conveyed by the second conveyance unit to the customer, and a control unit that is configured to perform conveyance control of each of the first conveyance unit, the second conveyance unit, and the third conveyance unit, and convey the article to the customer. With this configuration, articles are conveyed to customers located in various locations from locations that the articles are arranged, while locations that the articles are arranged for conveyance are diverged, whereby the articles can be quickly provided to the customers, and usability can be improved.

The conveyance system and the conveyance method can improve usability when conveying an article to a customer.

BRIEF DESCRIPTION OF THE DRAWINGS

FIGS. 3A-3F are plan views showing a plurality of examples of the conveyance system 100.

FIGS. 4A-4F are plan views showing a plurality of other examples of the conveyance system 100.

REFERENCE SIGNS LIST 100 conveyance system (conveyance device)
200 first conveyance unit (first conveyor)
300 second conveyance unit (second conveyor)
350 merging section (merging conveyor)
400 third conveyance unit (third conveyor)
500 control unit (electronic control unit)
600 input unit
610 user side input unit
620 customer side input unit
700 acquiring unit
800 guide unit

DETAILED DESCRIPTION

Hereinafter, examples will be described with reference to the drawings.
Configuration of Conveyance System 100

Figure 1:
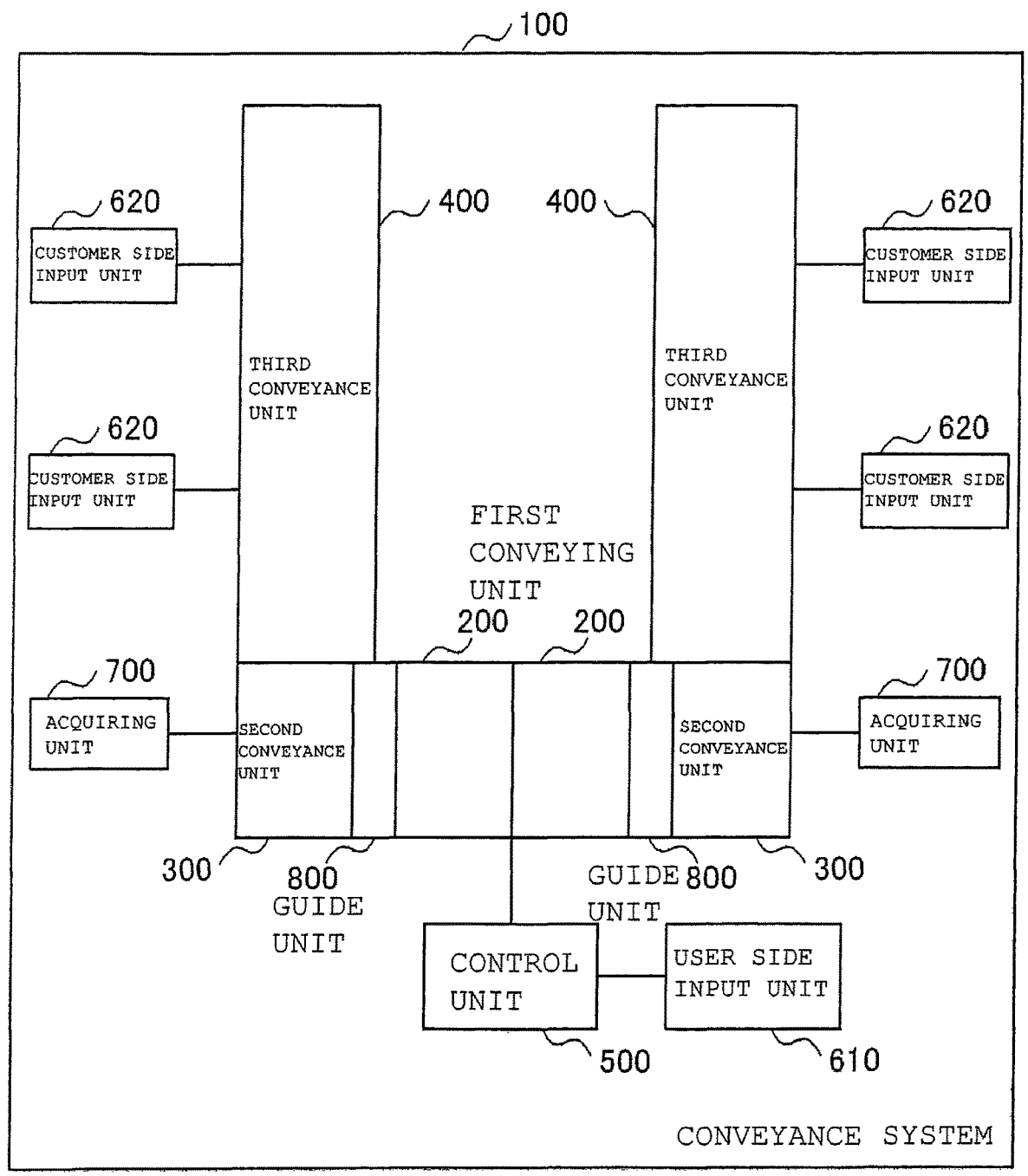
FIG. 1 is a block diagram showing an example of a configuration of a conveyance system 100.

FIG. 1 is a block diagram showing an example of a configuration of a conveyance system 100. As shown in FIG. 1, the conveyance system 100 is configured to include (a) first conveyance unit(s) 200, (a) second conveyance unit(s) 300, (a) third conveyance unit(s) 400, and a control unit 500. In addition, the conveyance system 100 may be configured to further include a user side input unit 610, customer side input units 620, an acquiring unit 700, and guide units 800.

The first conveyance unit 200 conveys an article arranged by a user. In addition, the first conveyance unit 200 may convey the arranged article to any one of the second conveyance units 300 based on instruction information transmitted from the control unit 500. According to the first conveyance unit 200, for example, an article arranged on the first conveyance unit 200 by the user, separately from the article arranged in the second conveyance unit 300, can be conveyed to the second conveyance unit 300, and can be conveyed to the customer sitting along the third conveyance unit. As a result, since the articles can be arranged and conveyed by each of the first conveyance unit 200 and the second conveyance unit, articles can be conveyed to customers in a dispersed manner with ease of use.

A plurality of first conveyance units 200 are provided, and each of the first conveyance units 200 are capable of conveying an article bi-directionally, and the conveyed articles may be conveyed to each of the second conveyance units 300. According to the first conveyance unit 200, the articles can be conveyed to the plurality of first conveyance units 200 provided in parallel or substantially in parallel, and can be conveyed to customers sitting along each of the third conveyance units 400 provided in parallel or substantially in parallel. In other words, the articles can be conveyed to all customers on both sides of the third conveyance units 400 even from the location where the first conveyance unit 200 is arranged.

According to the first conveyance unit 200, for example, the article arranged by the user in the first conveyance unit 200 can be arranged, separately from the article conveyed by the second conveyance unit 300, can be conveyed to any one of a plurality of second conveyance units 300 provided in parallel or substantially in parallel on both sides of the first conveyance unit 200, whereby articles can be conveyed to customers sitting along any one of the third conveyance units provided in parallel or substantially parallel, and the articles to be conveyed centrally to the first conveyance unit 200 and the articles to be conveyed to the second conveyance unit 300 in addition to the first conveyance unit 200 can be conveyed separately by type of the article, and can be conveyed to customers located at various locations with little difference at the moment of delivery of the articles.

Two first conveyance units 200 may be provided to convey the arranged articles, and may be connected to each other so that the articles can be delivered. Moreover, the first conveyance unit 200 may be provided with one or more, and may convey the arranged articles. The first conveyance unit 200 may convey the arranged article, deliver the article to the second conveyance unit 300, or deliver the article to the third conveyance unit 400, and convey to customers sitting along the third conveyance unit.

According to the first conveyance unit 200, an article can be conveyed from the arrangement location of the first conveyance unit 200 to the second conveyance unit 300 or the third conveyance unit 400, and finally, articles can be conveyed to a plurality of customers located in various location sitting along the third conveyance unit 400. According to the first conveyance unit 200, for example, even when a cooking appliance can be provided only by installing for convenience of the cooking appliance, without moving from a location near the cooking appliance, articles can be conveyed to customers located in various locations.

As an example, the first conveyance unit 200 may be provided such that the arrangement location (the conveyance start location) is located at the center of the conveyance system 100 for the purpose of conveying articles to a customer from near the center of the conveyance system 100 in the lateral direction and from the center of the kitchen area by a store clerk. As a result, for example, articles can be efficiently conveyed to each customer located on both sides in the lateral direction of the eating and drinking area.

The first conveyance unit 200 may be any conveyors (conveyance passage, conveyance lane) that arrange articles and continuously convey the articles, and a chain conveyor (including crescent chain conveyor), an endless belt conveyor, a roller conveyor or the like may be used. Specifically, as an example, when the first conveyance unit 200 is a crescent chain conveyor, the first conveyance unit 200 is configured to include a chain body, a crescent-shaped top plate arranged on the chain body, a sprocket, and a driving device such that the chain is driven by power transmitted from the driving device via the sprocket or the like.

The first conveyance unit 200 may include one conveyance lane, or two or more conveyance lanes. In addition, the lane(s) of the first conveyance unit 200 may convey the articles in one direction or in the reverse direction. Also, the lane(s) of the first conveyance unit 200 may be endlessly circulated in a circular or elliptic shape. The conveyance speed of the first conveyance unit 200 may be 4 to 5 m/min, and more preferably, 4.8 m/min.

The first conveyance unit 200 may be arranged such that at least a part of the conveyance direction of the article intersects with the conveyance direction of the third conveyance unit 400. As a result, for example, articles can be efficiently conveyed to each customer sitting at a table arranged along the third conveyance unit 400 located on both sides of the eating and drinking area.

In addition, in the first conveyance unit 200, an identification piece (including an IC tag or the like) is embedded into the article and, for example, when the article is a food or a drink, the IC tag or the like is embedded into a plate, and identification information of the IC tag may be read by a detection sensor such as wireless communication of the acquiring unit 700.

Furthermore, a conveyance body (not shown) for arranging the articles to carry may be separately prepared, and the identification piece may be embedded into the conveyance body.

Further, regarding the arrangement of the articles in the first conveyance unit 200, an inlet for the articles may be provided and arranged in the first conveyance unit 200, or even though without providing equipment for the conveyance, the articles may be arranged with the end or a predetermined location on the conveyor as a start location where articles are conveyed.

The second conveyance unit 300 is connected to the first conveyance unit 200, and conveys the article conveyed from the first conveyance unit 200, and, when the user newly arranges an article, is capable of conveying the article.

According to the second conveyance unit 300, the article conveyed from the first conveyance unit 200, in addition to the above article, the article newly arranged in the second conveyance unit 300 can be conveyed to customers sitting along the conveyance unit 400. In other words, the articles can be conveyed to the customer from either the arrangement place of the first conveyance unit 200 or the arrangement place of the second conveyance unit 300.

A plurality of second conveyance units 300 may be provided in parallel or substantially in parallel. With this configuration, for example, articles can be efficiently conveyed to customers sitting along the third conveyance unit 400 and located at both ends of the counter area or eating and drinking area.

According to the second conveyance unit 300, articles can be conveyed to customers sitting along the third conveyance unit 400. In addition, according to the second conveyance unit 300, for example, it is possible to divide an article which is selling best by the two second conveyance unit 300 on both sides and convey the article to customers sitting along the third conveyance unit 400.

As an example, the second conveyance unit 300 are provided in a kitchen area, and provided in parallel or substantially in parallel near both sides in the lateral direction of the conveyance system 100 and near both sides of the kitchen area for two store clerks to convey articles to customers, the arrangement location (the conveyance start location) may be provided at two places on both sides of the conveyance system 100. As a result, for example, articles can be efficiently conveyed to each of customers located on both sides in the lateral direction of the eating and drinking area.

The second conveyance unit 300 may be any conveyors (conveyance passage, conveyance lane) for placing articles and continuously conveying the articles, and a chain conveyor (including crescent chain conveyor), an endless belt conveyor, a roller conveyor or the like may be used. Specifically, as an example, when the second conveyance unit 300 is a crescent chain conveyor, the second conveyance unit 300 is configured to include a chain body, a crescent-shaped top plate arranged on the chain body, a sprocket, and a driving device such that the chain is driven by power transmitted from the driving device via the sprocket or the like.

The second conveyance unit 300 may include one conveyance lane, or two or more conveyance lanes. In addition, the lane(s) of the second conveyance unit 300 may convey the articles in one direction or in the reverse direction. Also, the lane(s) of the second conveyance unit 300 may be endlessly circulated in a circular or elliptical shape. The conveyance speed of the second conveyance unit 300 may be 4 to 5 m/min, and more preferably 4.8 m/min.

The second conveyance unit 300 may be arranged such that at least a part of the conveyance direction of the article is identical to the conveyance direction of the third conveyance unit 400. As a result, for example, articles can be efficiently conveyed to each of the customers sitting at a table arranged along the third conveyance unit 400 and located on both sides of the eating and drinking area.

In addition, in the second conveyance unit 300, an identification piece (including an IC tag or the like) is embedded into the article and, for example, when the article is a food or a drink, the IC tag or the like is embedded into a plate, and the identification information of the IC tag may be read by a detection sensor such as wireless communication of the acquiring unit 700. Furthermore, a conveyance body (not shown) for placing the articles to carry may be separately prepared, and the identification piece may be embedded into the conveyance body.

Further, regarding the arrangement of the articles in the second conveyance unit 300, an inlet for the articles may be provided and arranged in the second conveyance unit 300, or even though without providing equipment for the conveyance, the articles may be arranged with the end or a predetermined location on the conveyor as a start location where articles are conveyed.

The third conveyance unit 400 is connected to the second conveyance unit, and conveys the article conveyed by the second conveyance unit 300 to customers. In addition, a plurality of third conveyance units may be provided in parallel or substantially in parallel. As a result, the article arranged by the user in the first conveyance unit 200, which are conveyed by the second conveyance unit 300, and the article arranged by the user in the second conveyance unit 300 can be smoothly conveyed to customers who are located on both sides in the lateral direction.

Further, the third conveyance unit 400 may be connected to the first conveyance unit 200, and may convey the articles conveyed by the first conveyance unit 200 to the customer.

The third conveyance unit 400 may be any conveyors (conveyance passage, conveyance lane) for placing articles and continuously conveying the articles, and a chain conveyor (including crescent chain conveyor), an endless belt conveyor, a roller conveyor or the like may be used. Specifically, as an example, when the third conveyance unit 400 is a crescent chain conveyor, the third conveyance unit 400 is configured to include a chain body, a crescent-shaped top plate arranged on the chain body, a sprocket, and a driving device such that the chain is driven by power transmitted from the driving device via the sprocket or the like.

The third conveyance unit 400 may include one convey lane, or two or more convey lanes. In addition, the lane(s) of the third conveyance unit 400 may convey articles in one direction or in the reverse direction. Also, the lane(s) of the third conveyance unit 400 may be endlessly circulated in a circular or elliptical shape. The conveyance speed of the third conveyance unit 400 may be 4 to 5 m/min, and more preferably, 4.8 m/min.

The third conveyance unit 400 may be arranged such that at least a part of the conveyance direction of the article is identical to the conveyance direction of the second conveyance unit 300. With this configuration, the third conveyance unit 400 conveys the article to the customer, for example, along the second conveyance units 300 located on both sides of the kitchen area, and thus articles can be smoothly and efficiently conveyed.

In addition, in the third conveyance unit 400, an identification piece (including an IC tag or the like) is embedded into the article and, for example, when the article is a food or a drink, the IC tag or the like is embedded into a plate, and the identification information of the IC tag may be read by a detection sensor such as wireless communication of the acquiring unit 700. Furthermore, a conveyance body (not shown) for placing the articles to carry may be separately prepared, and the identification piece may be embedded into the conveyance body.

The control unit 500 performs conveyance control of each of the first conveyance unit 200, the second conveyance unit 300, and the third conveyance unit 400, and controls to convey an article to a customer. Specifically, as an example, the control unit 500 transmits an instruction of conveyance control to each of the first conveyance unit 200, the second conveyance unit 300, and the third conveyance unit 400. As a result, the control unit 500 can convey the article independently to each of the first conveyance unit 200, the second conveyance unit 300, and the third conveyance unit 400.

The control unit 500 controls any of the first conveyance unit 200, the second conveyance unit 300, and the third conveyance unit 400 based on conveyance information on the conveyance location of the article.

"Conveyance information" is information indicating the conveyance status generated from the conveyance location of the articles and, specifically, the conveyance location of the articles at a specific time, the articles at a predetermined location at a specific time, and is information on the conveyance speed of each article, the conveyance interval between articles in a given section at a specific time and the like. It is desirable that the specific time is within a range in which the control can be effectively performed from the time when the control unit 500 performs the appropriate control, and within a range in which the current conveyance condition of the articles can be indicated. Thus, the control unit 500 can perform conveyance control of the first conveyance unit 200, the second conveyance unit 300, and the third conveyance unit 400 based on the current conveyance condition of the article, and articles can be smoothly conveyed.

The control unit 500 performs conveyance control of each of the first convey unit 200 or the third convey unit 400 to convey the article arranged in the first convey unit 200 to the customer sitting along the third convey unit 400.

Specifically, as an example, the control unit 500 can control such that, when an article is arranged on the first conveyance unit 200, the control unit 500 performs control to start the conveyance operation of the first conveyance unit, and when the articles are conveyed by the first conveyance unit 200 to within the predetermined range of the connection point of the first conveyance unit 200 and the third conveyance unit 400, control can be performed such that the conveyance operation of the third conveyance unit 400 is started, an article can be delivered from the first conveyance unit 200 to the third conveyance unit 400 at the connection point, and the article is conveyed by the third conveyance unit 400.

The predetermined range may be determined based on the width of the article to be conveyed. According to the control unit 500, by controlling the first conveyance unit 200 or the third conveyance unit 400, the control unit 500 can control such that the articles arranged in the first conveyance unit 200 can be conveyed to the customer sitting along the third conveyance unit 400, and articles can be efficiently conveyed to customers.

The control unit 500 performs conveyance control of each of the first conveyance unit 200 or the third conveyance unit 400 to convey the articles arranged in the first conveyance unit 200 to the customer of the third conveyance unit 400.

Specifically, as an example, the control unit 500 can control such that, when an article is arranged on the first conveyance unit 200, the control unit 500 controls the start of the conveyance operation of the first conveyance unit, and when the articles are conveyed by the first conveyance unit 200 to within the predetermined range of the connection point of the first conveyance unit 200 and the third conveyance unit 400, a control action can be performed such that the conveyance operation of the third conveyance unit 400 is started, an article can be delivered from the first conveyance unit 200 to the third conveyance unit 400 at the connection point, and the article is conveyed by the third conveyance unit 400.

The predetermined range may be determined based on the width of the article to be conveyed. According to the control unit 500, by controlling the first conveyance unit 200 or the third conveyance unit 400, the control unit 500 can control such that the articles arranged in the first conveyance unit 200 can be conveyed to the customer sitting along the third conveyance unit 400, and the articles can be efficiently conveyed to the customer.

The control unit 500 controls the first conveyance unit based on the conveyance information including at least one of the conveyance location, the conveyance speed of the articles, and the conveyance interval between the articles in a predetermined section acquired by the acquiring unit 700.

The control unit 500 controls the guide unit 800 based on the conveyance information. Specifically, as an example, the control unit 500 changes the conveyance location of the conveyed article at the connected point of first conveyance unit 200 and second conveyance unit 300 based on the conveyance information. As a result, for example, in a conveyance situation in which the conveyance of articles is congested at the connection point, the conveyance of the first conveyance unit 200 can be stopped by the guide unit 800, and conveyance can be performed taking congestion of articles into consideration.

The control unit 500 may be a dedicated computer for the conveyance system that is configured to include an input/output unit (touch panel, keyboard, scanner, input/output interface or the like), an operation unit, a control unit, and a central processing unit (CPU (central processing unit), microprocessor, processor and the like), and a storage unit (main storage unit, auxiliary storage unit or the like) or may be software or an application installed and used on a general-purpose computer.

The control unit 500 controls at least one of the first conveyance unit 200, the second conveyance unit 300, and the third conveyance unit 400 based on input information of the input unit 600. Specifically, as an example, the control unit 500 performs conveyance control such that the control unit 500 inputs an order for an article from a customer from the input unit 600, and based on the input information, the control unit 500 sequentially moves the first conveyance unit 200, the second conveyance unit 300 and the third conveyance unit 400 to convey the article.

The control unit 500 controls the first conveyance unit 200, the third conveyance unit 400, a first merging unit 350, the third conveyance unit 400, and then the input unit 600 (user side input unit 610, customer side input units 620), the acquiring unit 700, and the guide unit 800. The communication for transmitting the control command to each unit and receiving the control result may be either wireless or wired communication format.

The input unit 600 is configured to include the user side input unit 610 and the customer side input units 620. The input unit 600 receives input information of an article to be conveyed to a customer. The input unit 600 transmits the received input information to the control unit 500. Specifically, as an example, the input unit 600 displays the input of the article conveyance request, and transmits the input result to the control unit.

Specifically, the input unit 600 is implemented by software or an application that includes a GUI that displays the input of a conveyance request of an article or a device having a GUI that displays an input of the conveyance request of the article, including a touch panel, a tablet, a smartphone, a laptop computer, a desktop computer, a keyboard attached to the computer.

The acquiring unit 700 acquires conveyance information regarding the conveyance location of the arranged article.

Specifically, the acquiring unit 700 acquires conveyance location information of an article at a specific time point in the first conveyance unit 200, the second conveyance unit 300, and the third conveyance unit 400, and acquires the information, and based on the location information, the conveyance speed of the article at a predetermined location at a specific time, the conveyance interval between articles at a predetermined section at a specific time and the like are generated and acquired.

In addition, the acquiring unit 700 acquires the number of sales for each article in a predetermined period or the sales frequency for each article.

The acquiring unit 700 embeds a two-dimensional code such as an identification piece (IC tag) or a QR code in advance on an article or a conveyance body that places the article thereon to carry, and conveyance location information of articles may be acquired based on the identification information by using wireless communication. In addition, an infrared sensor or the like may be used to detect an article by using the infrared sensor or the like without embedding an identification piece or the like in advance, and location information of the detected article may be acquired.

The guide unit 800 is configured to change the conveyance location of the conveyed article at the connection point of the first conveyance unit 200 and the second conveyance unit 300 based on the instruction information transmitted from the control unit 500. As a result, the guide unit 800 can support smooth delivery of articles from the first conveyance unit 200 to the second conveyance unit 300.

Specifically, the guide unit 800 changes the conveyance direction of the article at the connection point of the first conveyance unit 200 and the third conveyance unit 400 or stops the conveyance of the article.

Specifically, as an example, the guide unit 800 is configured to include a pillar of support and a rod-like member extending from the pillar of support, and achieves change of the conveyance direction of the article by pushing out the article from the first conveyance unit 200 to the third conveyance unit 400 by pivoting of the rod-like member about the pillar of support, and delivery of the article from the first conveyance unit 200 to the second conveyance unit 300 based on control instruction information of the control unit 500.

Further, based on the control instruction information of the control unit 500, the guide unit 800 can stop the conveyance of an article by interrupting the conveyance of the article by putting the rod-like member up and down in the vertical direction and resume the conveyance of the stopped articles.

The guide unit 800 may be configured to include a chain-like member extending from the pillar of support, and the chain-like member can be freely bent or stretched, and can be stretched when the article may be pushed out and bendable when storing and returning to a predetermined location.

The above is the configuration of the conveyance system 100.

Figure 2:
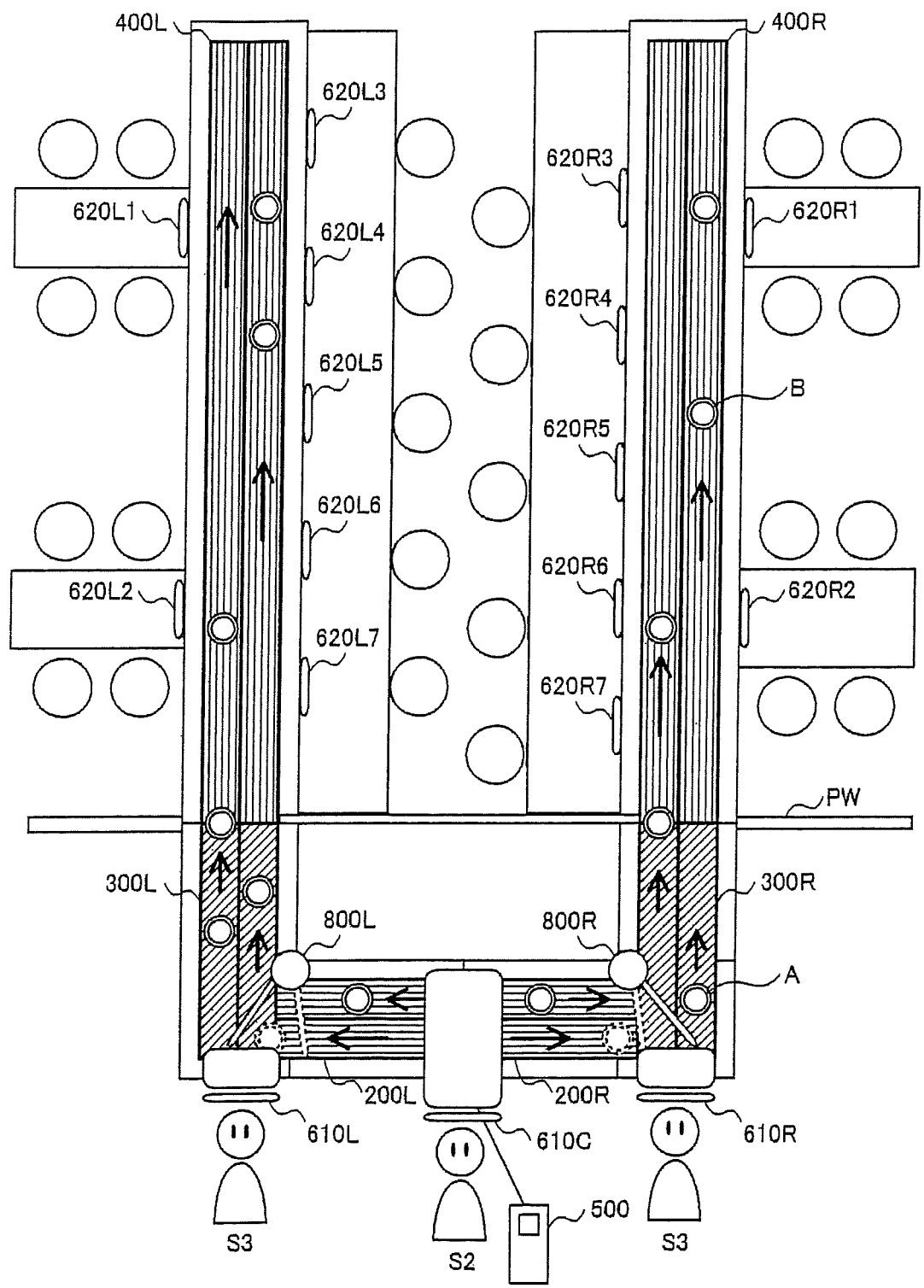
FIG. 2 is a diagram schematically showing an example of an overview of the conveyance system 100.

FIG. 2 is a view schematically showing an example of an overview of the conveyance system 100. This example is an example in which the conveyance system 100 for the conveyance device for provision of the food (for example, sushi in a sushi-go-round or the like) to customers in a restaurant (for example, a sushi-go-round or the like).

In the example, the first conveyance unit 200 is a first conveyor 200, the third conveyance unit 400 is a second conveyor 300, and the user input unit 610 is a user touch panel 610, the control unit 500 is an electronic control device 500, the acquiring unit 700 is a detection sensor 700, and the guide unit 800 is a guide member 800.

The first conveyor 200, the second conveyor 300, and the third conveyor 400 are provided with two lanes, each of which conveys articles in one direction or the reverse direction.

As shown in FIG. 2, the conveyance system 100 according to the example includes the first conveyance unit 200 that conveys the articles arranged by the user, the second conveyance unit 300 connected to the first conveyance unit 200, and conveys articles conveyed from the first conveyance unit 200, and, when the user newly arranges an article, is capable of conveying the article, the third conveyance unit that is connected to the second conveyance unit 200 and conveys the article conveyed by the second conveyance unit 300, and the control unit 500 controls the conveyance of each of the first conveyance unit, the second conveyance unit, and the third conveyance unit.

Further, as shown in FIG. 2, in the conveyance system 100, a plurality of second conveyance units 300 and a plurality of third conveyance units 400 are provided, and the first conveyance unit 200 may convey the arranged article to one of the second conveyance units 300 based on the instruction information transmitted from the control unit 500. Furthermore, as shown in FIG. 2, in the conveyance system 100, the first conveyance unit 200 includes a plurality of articles, and based on the instruction information transmitted from the control unit 500, the arranged articles may be conveyed to a different conveyance unit included in the second conveyance unit 300.

In FIG. 2, a wall separating the eating and drinking area, and the kitchen area is denoted as PW. The area below PW is the kitchen area, and the area above PW is the eating and drinking area.

In the conveyance apparatus 100, the store clerk (S2) in the kitchen area first arranges food A on the first conveyor 200R, inputs the start of conveyance on the user-side touch panel 610C, and the conveyance of the food A is started on the first conveyor 200R.

At the same time, another store clerk (S3) arranges food B on the second conveyor 300, inputs the conveyance start on the user-side touch panel 610, and the conveyance of the food B is started on the second conveyor 300. Next, when the food A conveyed by the first conveyor 200 is conveyed to the vicinity of the connection point of the first conveyor 200 and the second conveyor 300, the electronic control unit 500 controls such that the guide member 800 is swung down, for example, when the electronic control unit 500 determines that the conveyance location of the food B is in the vicinity of the connection point based on the conveyance information of the food B conveyed by the second conveyor 300 acquired by the second conveyor 300 (not shown), the electronic control unit 500 temporarily stops the conveyance of the food A by the first conveyor 200.

The electronic control unit 500 controls such that the guide member 800 is swung up based on the conveyance information of the food B of the second conveyor acquired by the detection sensor 700 again after a predetermined period of time, and then the food A is pushed out by making the guide member 800 swung down such that the food A is delivered from the first conveyor 200 to the second conveyor 300. The second conveyor 300 conveys the food A following the food B and delivers the food A and the food B to the third conveyor 400, and the third conveyor 400 conveys the food A and the food B to a customer. Thus, foods can be streamed from the locations of the store clerks S2 and S3, and convey to the seat of the customer sitting along the third conveyor 400R. Although conveyance of articles in one side (right side) of the conveyance system 100 was explained, articles can be similarly conveyed on the reverse left side, that is, there is little or no difference in arrival times of eating and drinking from the favorite location of both of the center of kitchen area and ends, and food can be provided to all the seats.

First Example

FIG. 3 is a plan view showing a plurality of examples A to F of a first configuration 1 of the conveyance system 100.

As shown in FIGS. 3A to 3F, the conveyance system 100 includes a first conveyance unit 200 configured to convey an article arranged by the user, a second conveyance unit 300 connected to the first conveyance unit 200 and conveys the articles conveyed from the first conveyance part 200, and, when a user newly arranges an article, is capable of conveying the article, a third conveyance unit connected to the second conveyance unit 300 and conveys the articles conveyed by the second conveyance unit 300 to the customer, and a control unit that is configured to perform conveyance control of each of the first conveyance unit, the second conveyance unit, and the third conveyance unit, and convey articles to customers.

Further, as shown in FIGS. 3A to 3F, in the conveyance system 100, both of the second conveyance unit 300 and the third conveyance unit 400 may be provided in a plural form, and the first conveyance unit 200 may convey the arranged article to any one of the second conveyance units 300 based on the instruction information transmitted from the control unit 500. Specifically, in the conveyance system 100 according to the first example, a plurality of the second conveyance units 300 and a plurality of the third conveyance units 400 may be provided in parallel or substantially in parallel, and the first conveyance unit 200 may convey the arranged articles to one of the second conveyance units 300 based on the instruction information transmitted from the control unit 500.

Figure 3B:
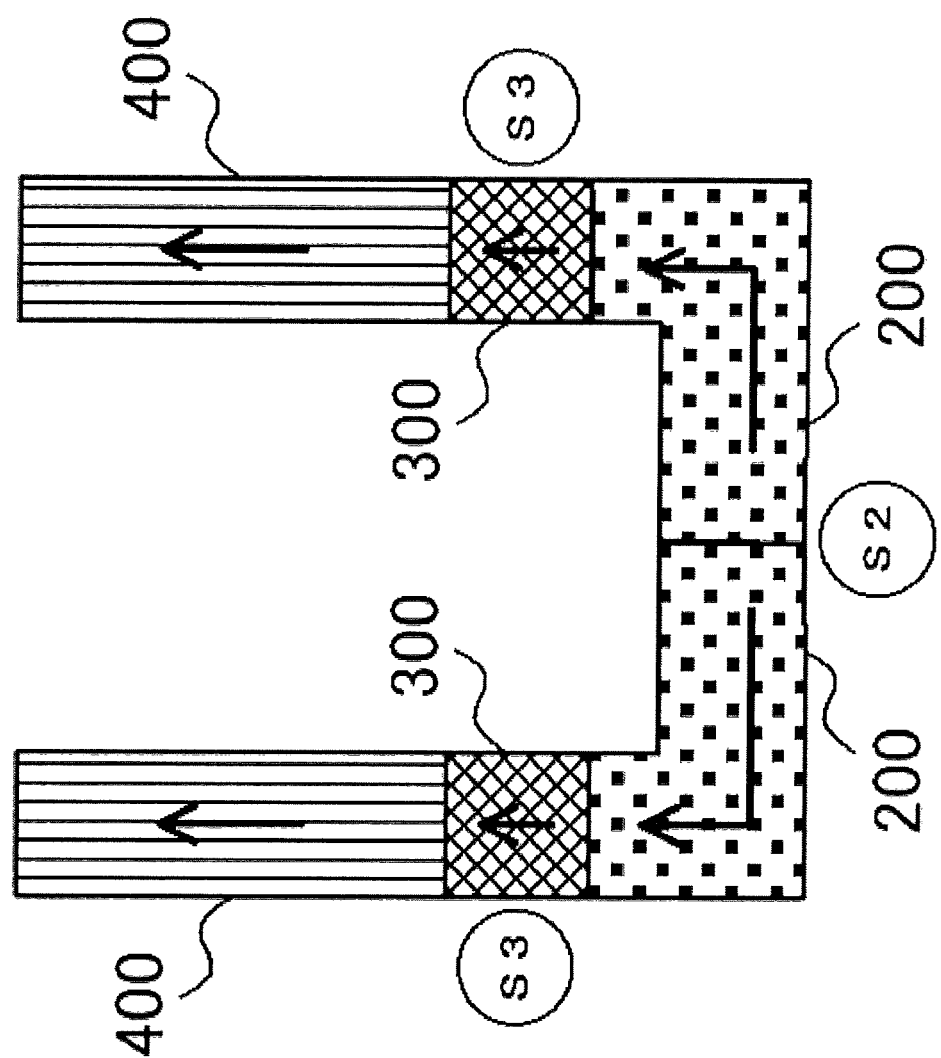
Figure 3C:
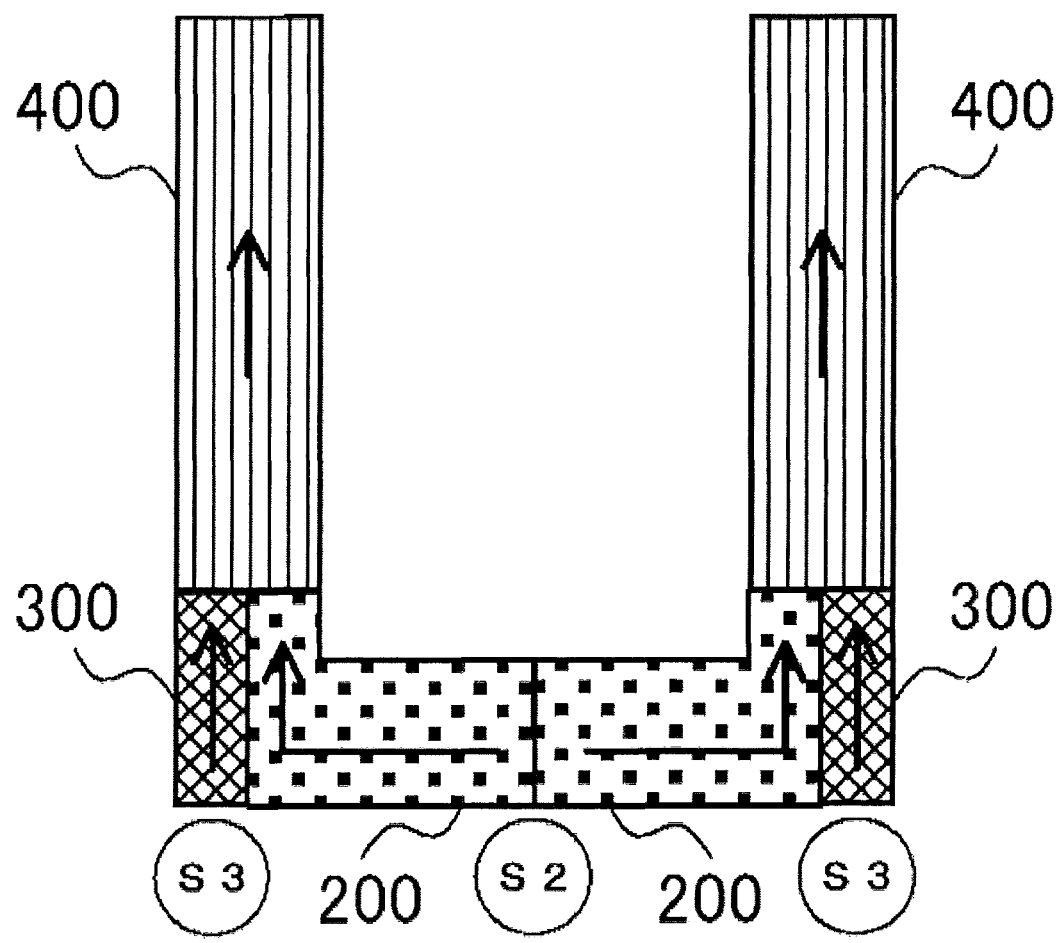

Furthermore, as shown in FIGS. 3A to B and E, in the conveyance system 100, the first conveyance unit 200 may be provided in a plural form, and may convey the arranged articles to a different conveyance unit included in the second conveyance units 300 based on the instruction information transmitted from the control unit 500. Specifically, for example, in the conveyance system 100, for example, a plurality of first conveyance units 200 may be provided, and the first conveyance units 200 may be capable of conveying the article in a reverse direction each other or in the same direction, and the conveyed articles may be conveyed to each of the second conveyance units 300.

In FIG. 3, the arrows indicate the conveyance directions of each of conveyance units, and what is written as S2 and S3 in a circle represents the arrangement location of the article sitting along the user (conveyance start location). For example, FIG. 3A illustrates an example in which, with the location of S2 as the location of the article arranged by the user, the first conveyance unit 200 conveys the article arranged at S2 by the user to the second conveyance unit 300 provided at both ends of the first conveyance unit 200, the second conveyance unit 300 conveys the articles conveyed from the first conveyance unit 200 to each of the third conveyance units 400 connected to the first conveyance unit 200, and the third conveyance unit 400 conveys the article conveyed from the second conveyance unit 300.

Figure 3D:
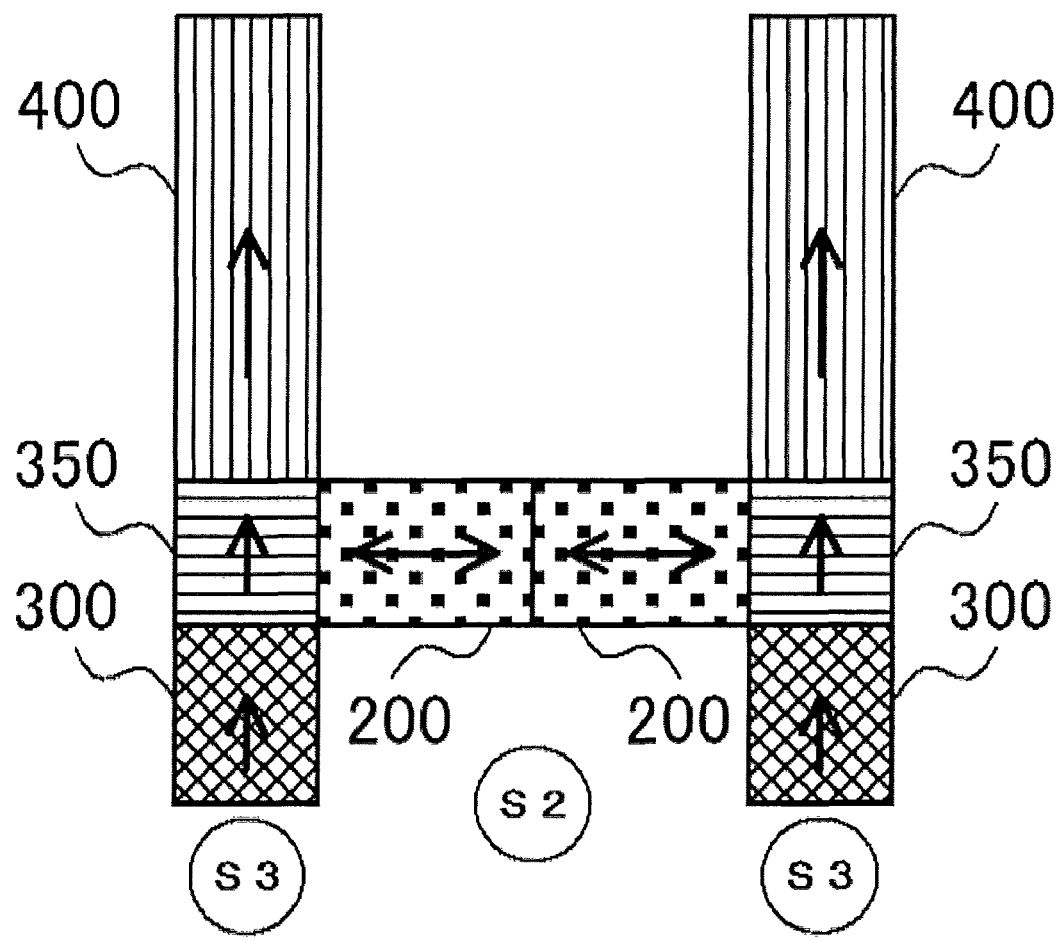
Figure 3E:
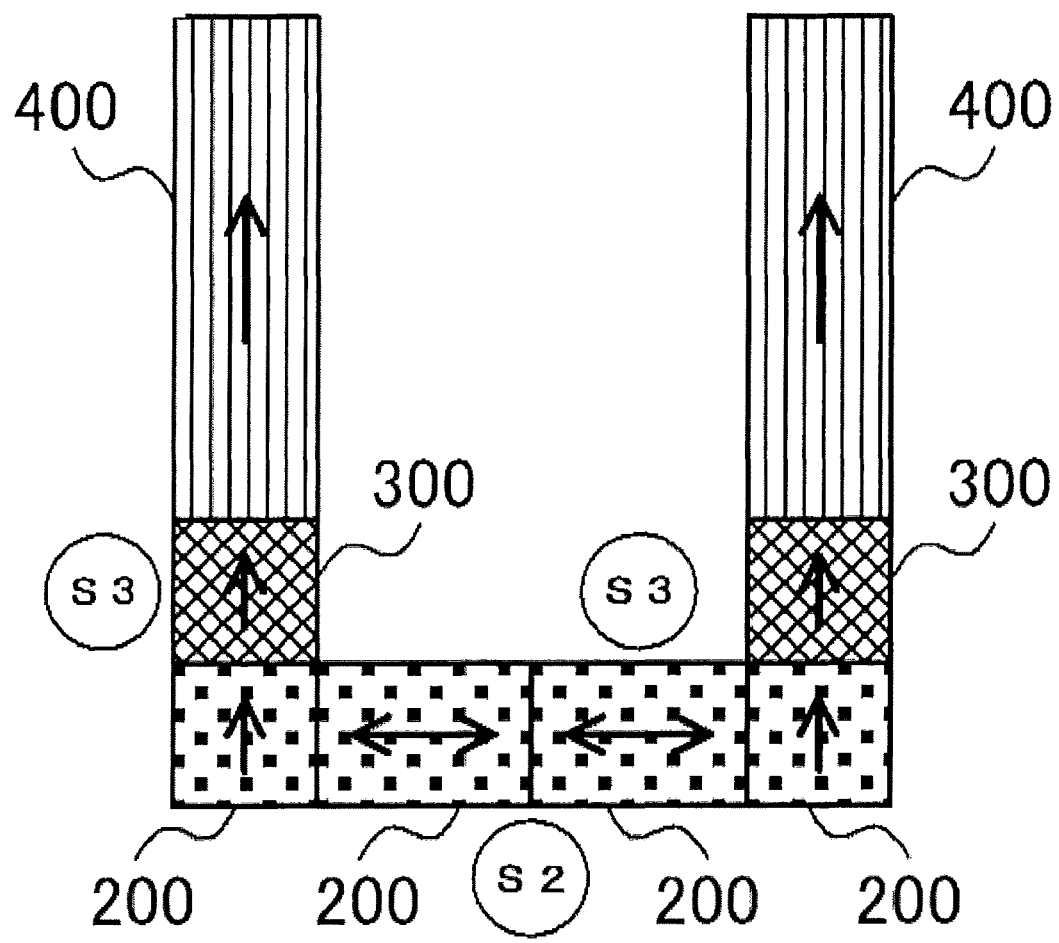
Figure 3F:
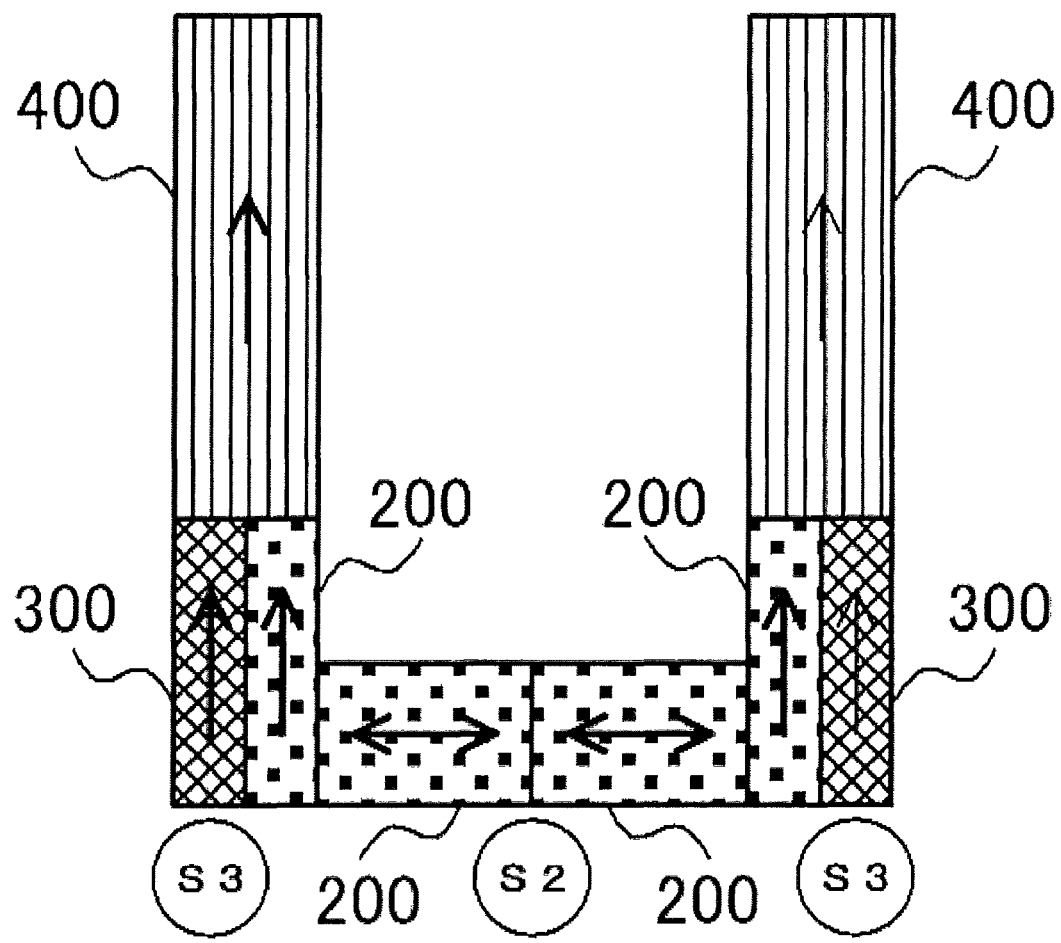

Further, FIG. 3D is different from the example of FIG. 3A, and shows an example in which the first conveyance unit 200 and the second conveyance unit 300 are provided to merge and connect during conveyance. In the example of FIG. 3D, the first conveyance unit 200 and the second conveyance unit 300 convey the article to the merging unit 350, and convey the articles from the merging unit 350 to the third conveyance unit 400.

Second Example

FIG. 4 is a plan view showing a plurality of examples A to F of the second configuration of the conveyance system 100.

As shown in FIGS. 4A to 4F, the conveyance system 100 includes a first conveyance unit 200 that conveys the articles arranged by the user, a second conveyance unit 300 that is connected to the first conveyance unit 200, conveys the articles conveyed from the first conveyance unit 200, and that, when the user newly arranges an article, is capable of conveying the article, a third conveyance unit that is connected to the second conveyance unit 300, and that conveys the article conveyed by the second conveyance unit 300 to the customer, and a control unit that is configured to perform conveyance control of each of the first conveyance unit 200, the second conveyance unit 300 and third conveyance unit 400.

Further, as shown in FIGS. 4A to 4F, in the conveyance system 100, the second conveyance unit 300 and the third conveyance unit 400 may be each provided in a plural form, and the first conveyance unit 200 may convey the arranged article to any one of the second conveyance unit 300 based on the instruction information transmitted from the control unit 500. In the conveyance system 100, both of the second conveyance unit 300 and the third conveyance unit 400 may be provided in parallel or substantially in parallel, and the first conveyance unit 200 may convey the arranged article to any one of the second conveyance units 300 based on the instruction information transmitted from the control unit 500.

In FIG. 4, the arrows indicate the conveyance directions of the respective conveyance units, and what is written as S2 and S3 in a circle represents the arrangement location of the article arranged by the user (conveyance start location). For example, FIG. 4A shows an example in which with the location of S2 as the article location arranged by the user, the first conveyance unit 200 conveys an article at S2 arranged by the user to the second conveyance unit 300 provided on the right side of the first conveyance unit 200, the second conveyance unit 300 on the right side conveys the articles conveyed from the first conveyance unit 200 to the third conveyance unit 400, and the third conveyance unit 400 that is configured to convey an article conveyed from the second conveyance unit 300.

Figure 4A:
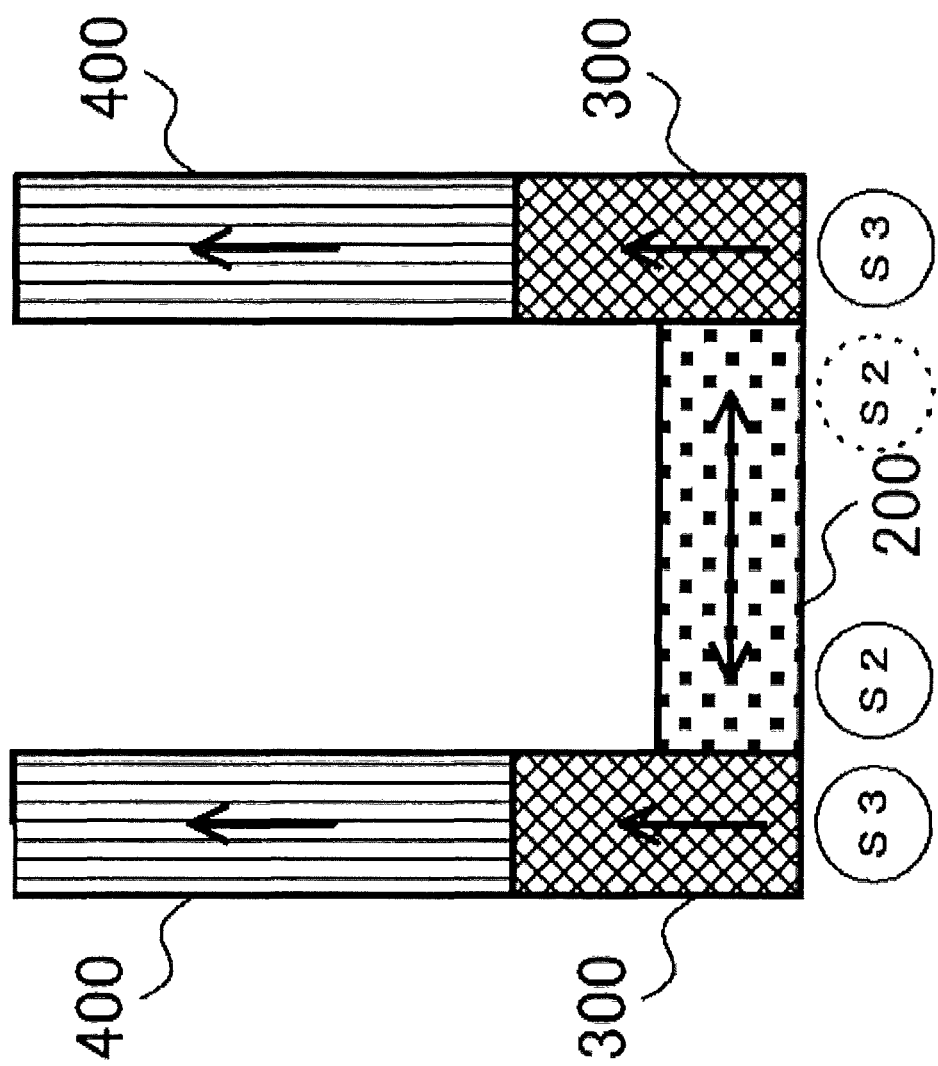
Figure 4C:
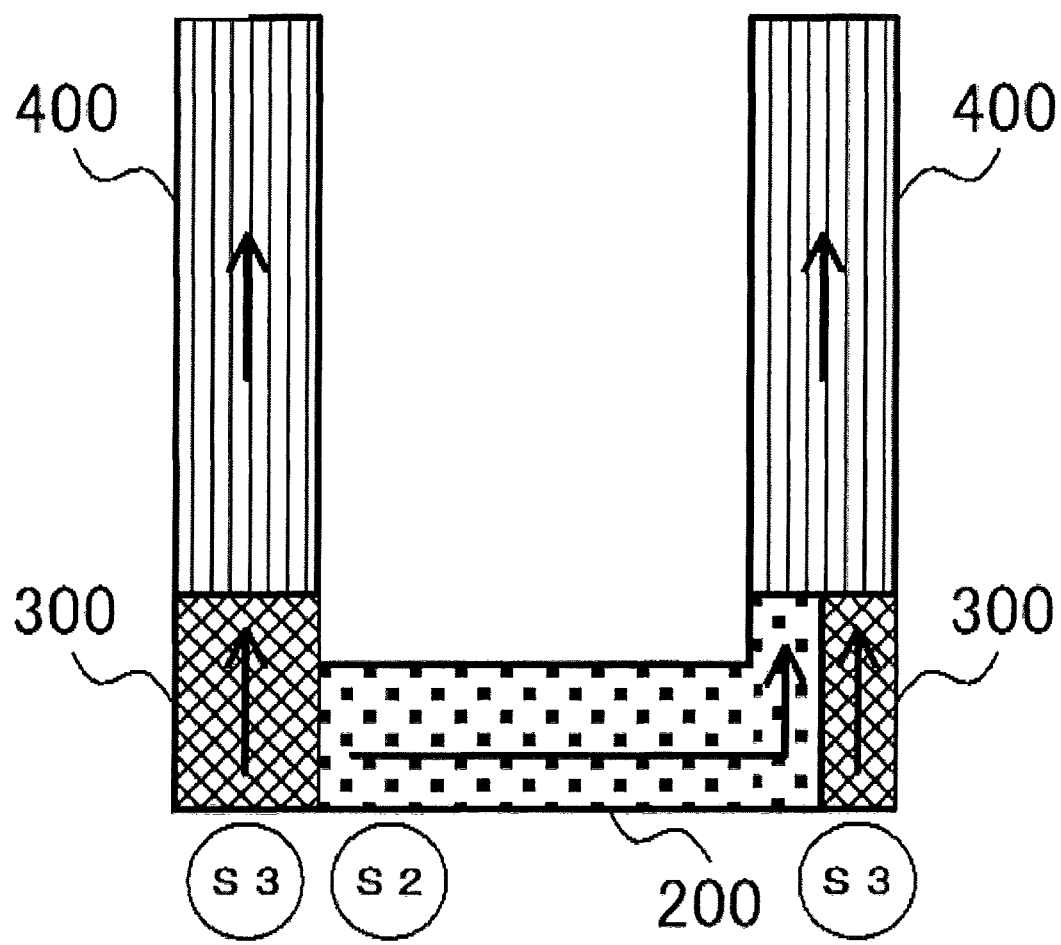
Figure 4D:
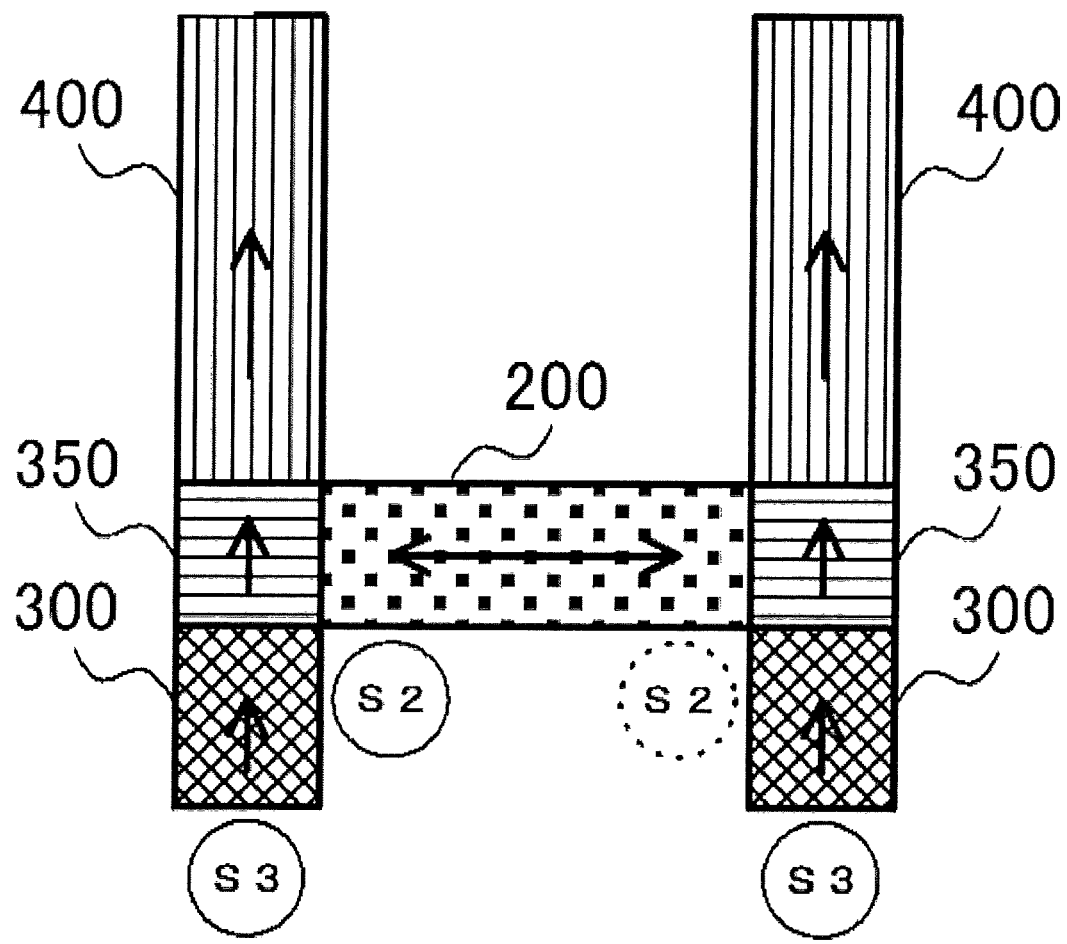
Figure 4E:
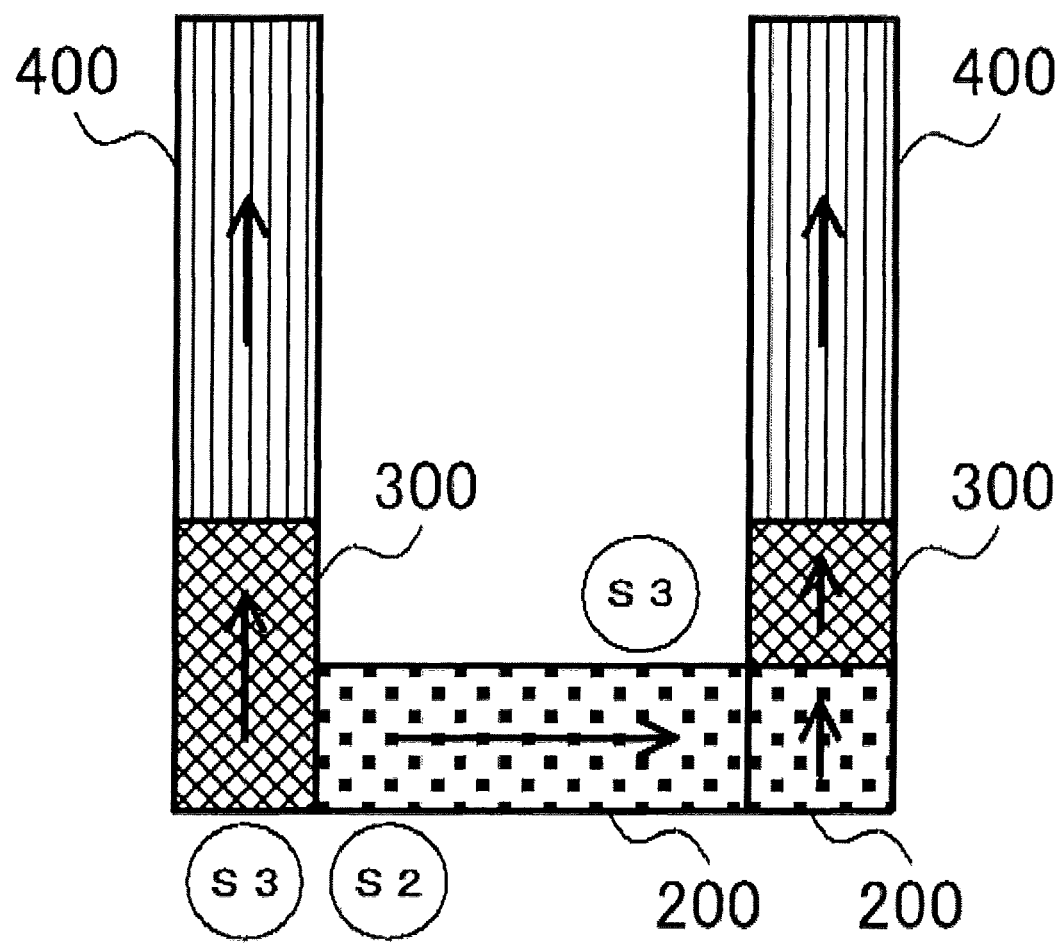
Figure 4F:
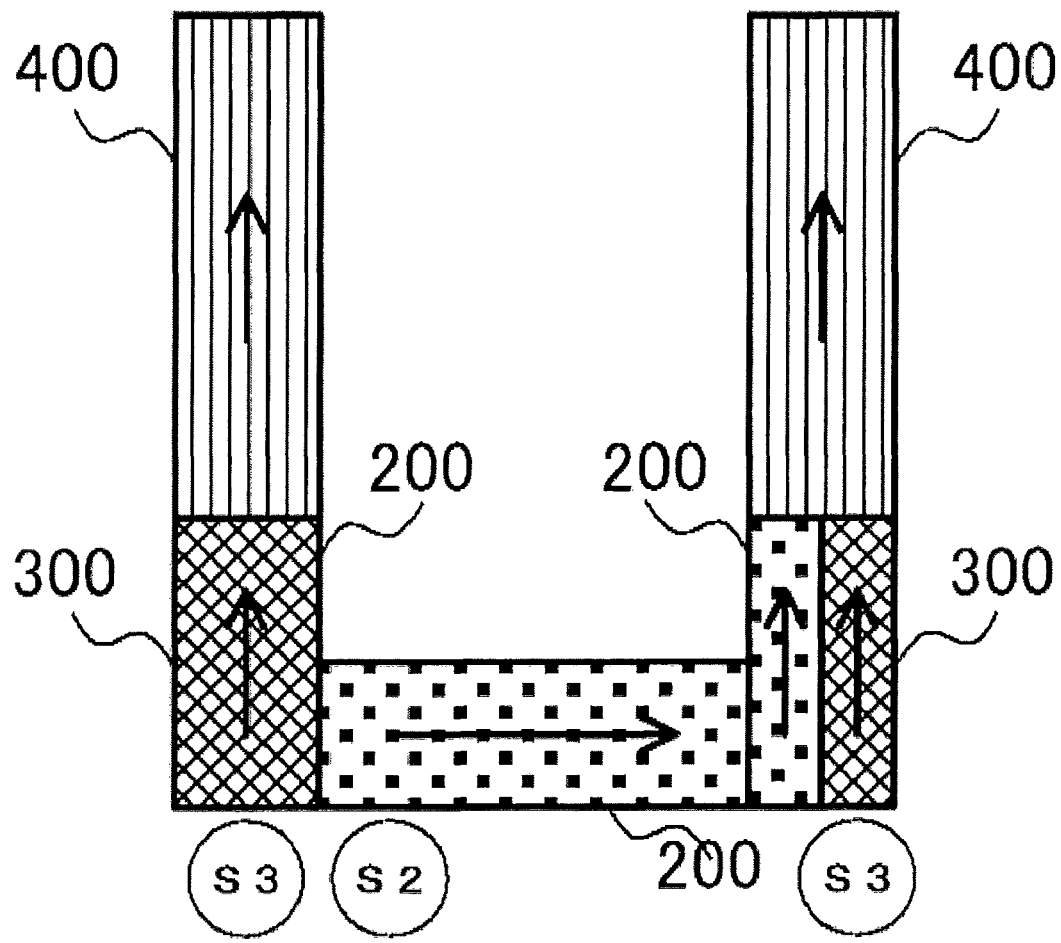

FIG. 4D is different from the example of FIG. 4A, and shows an example where the first conveyance unit 200 and the second conveyance unit 300 provided on the right side of the first conveyance unit 200 or the first conveyance unit 200 and the conveyance unit 300 on the left side of the first conveyance unit 200 are provided to merge and connected with each other along the way of the conveyance. In the example shown in FIG. 4D, one of the first conveyance unit 200 and the second conveyance unit 300 on the right side of the first conveyance unit 200 or the second conveyance unit 300 on the left side of the first conveyance unit 200 conveys an article on the right side or the left side merging unit 350, and the articles are conveyed from the merging unit 350 on the right side of the second conveyance unit 300 or the left side of the second conveyance unit 300 to the third conveyance unit 400.

Process Executed by Conveyance System 100

Figure 5:
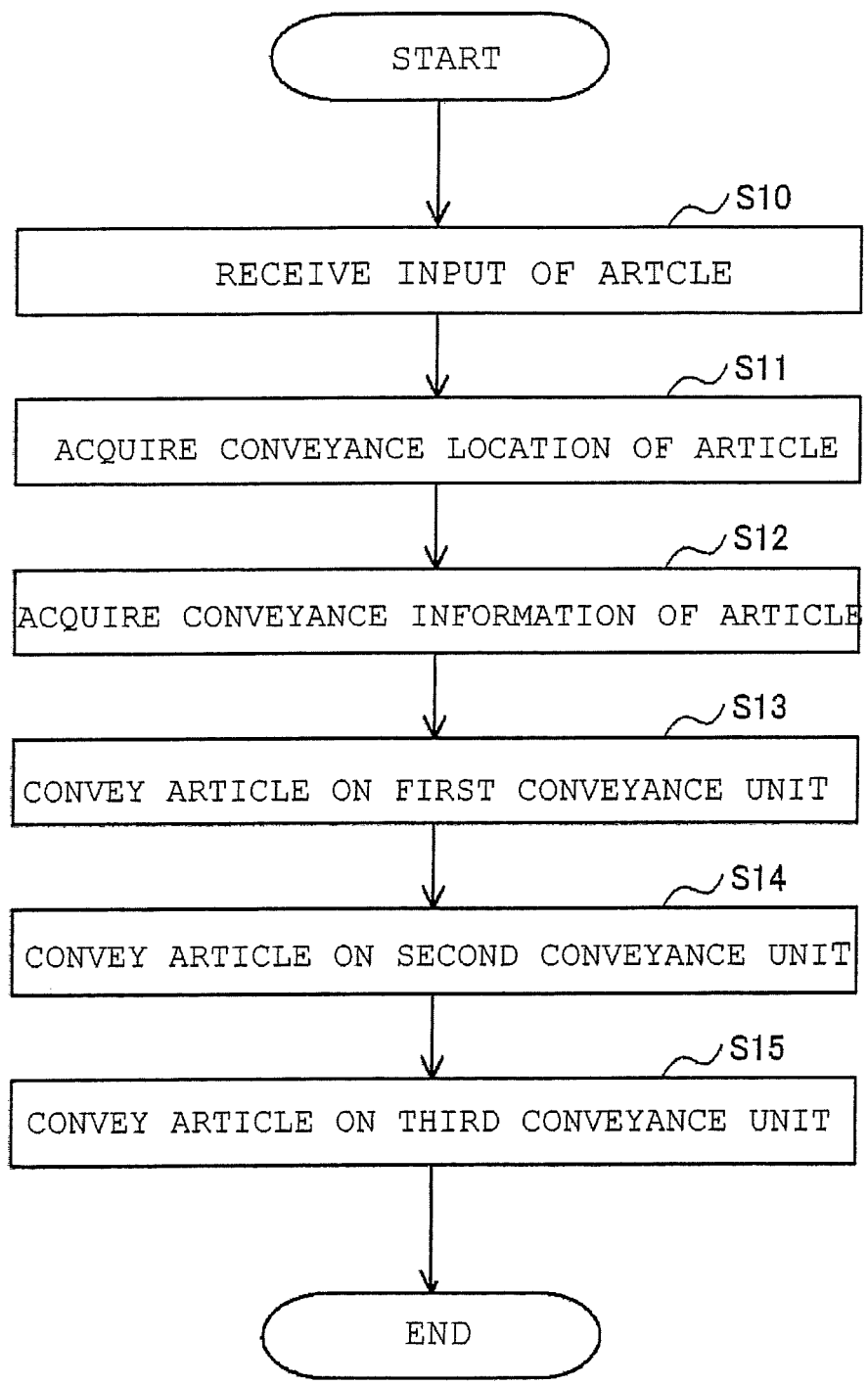
FIG. 5 is a flowchart showing an example of processing executed by the conveyance system 100.

FIG. 5 is a flowchart illustrating an example of a process executed by the conveyance system 100.

The input unit 600 receives an input of an article of a user (step S10).

The acquiring unit 700 acquires the conveyance location of the article (step S11). Thereafter, the acquiring unit 700 generates and acquires conveyance information from the acquired conveyance location (step S12).

The first conveyance unit 200 conveys the article arranged by the user (step S13).

The second conveyance unit 300 conveys the article conveyed from the first conveyance unit 200, or conveys an article newly arranged by the user (step S14).

The third conveyance unit 400 conveys the article conveyed from the second conveyance unit 300 to the customer (step S15).

The control unit 500 performs the conveyance control of each of the conveyance of the first conveyance unit 200, the conveyance of the second conveyance unit 300, and the conveyance of the third conveyance unit 400, and controls to convey the articles to the customer (steps S13 to S15).

Figure 6:
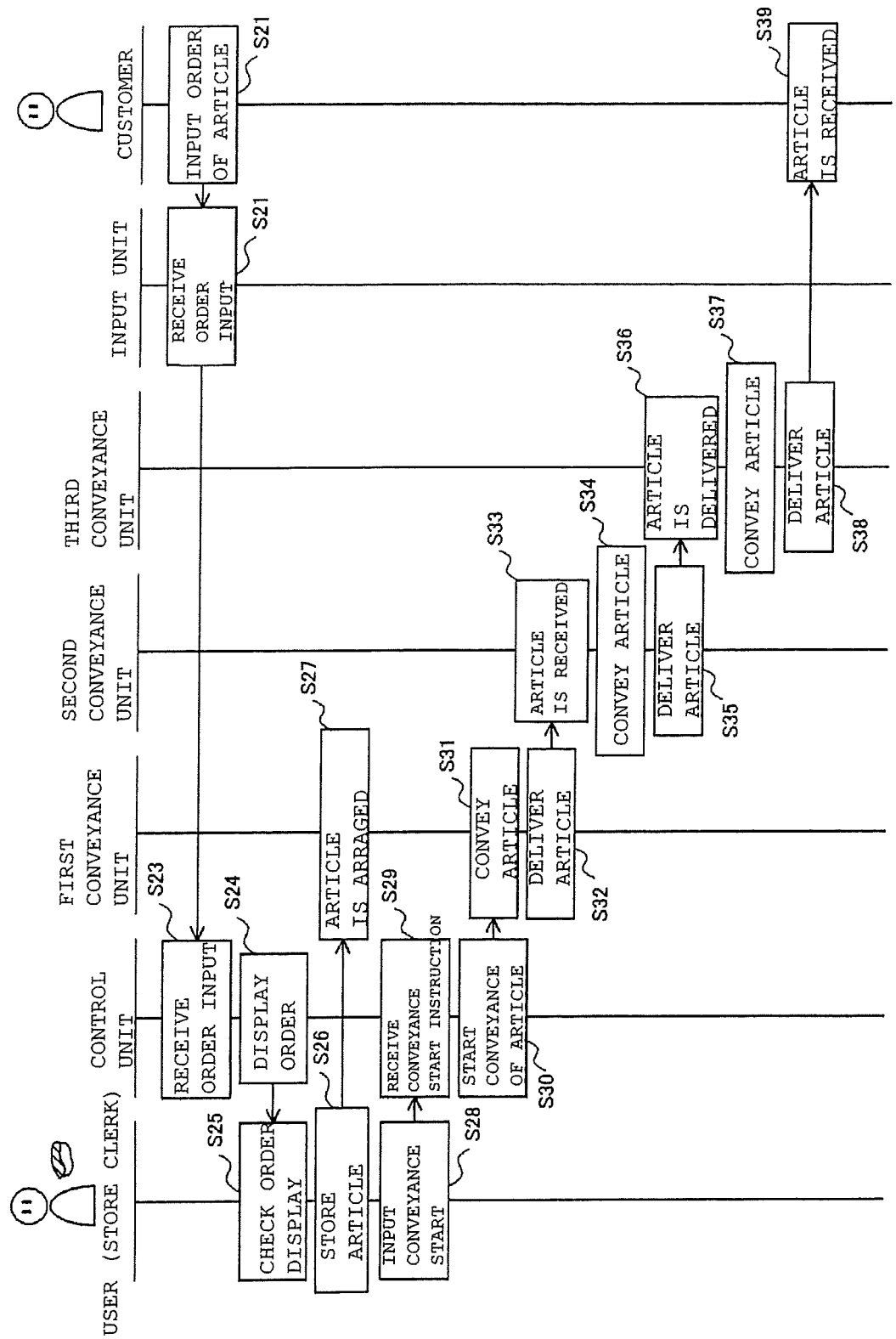
FIG. 6 is a sequence diagram showing an example of processing executed by the conveyance system 100.

FIG. 6 is a sequence diagram showing an example of processing executed by the conveyance system 100.

The customer inputs an order for an article (step S21).

The input unit 600 receives the order input, when the order is input (step S22).

The control unit 500 receives the order input transmitted from the input unit 600 (step S23). The control unit 500 displays the input order (step S24).

The user (for example, a store clerk) confirms the displayed order (step S25). After confirming the order display, the user arranges the article (step S26). The articles are arranged in the first conveyance unit (step S27). The user inputs the start of articles conveyance (step S28).

When the conveyance start is input, the control unit 500 receives a conveyance start instruction of the article (step S29). The control unit 500 starts conveying the articles (step S30).

The first conveyance unit 200 conveys the article when the conveyance of the article is started (step 31). The first conveyance unit 200 delivers the article to the second conveyance unit 300 (step S32).

When the second conveyance unit 300 receives the article (step S33), the second conveyance unit 300 conveys the article (step S34). The second conveyance unit 300 delivers the article to the third conveyance unit 400 (step S35).

When the third conveyance unit 400 receives the article (step S36), the third conveyance unit 400 conveys the article (step S37). The third conveyance unit 400 delivers the article to the customer (step S38), and the article reaches the customer (step S39).

OTHERS

A conveyance system employs provision of foods (for example, sushi in a sushi-ground or the like) to a customer in a restaurant (for example, a sushi-go-round or the like). However, other than the above provision, the systems can also be used to provide articles to customers in retail stores such as supermarkets and mass retailers, and to provide books to customers in bookstores, for example. By using the systems for these, articles can be smoothly conveyed to customers located at various locations from display place or storage place of articles.

Although our systems and methods have been described based on the drawings and examples, it should be noted that those skilled in the art can easily make various changes and modifications based on this disclosure. Therefore, such variations and modifications are included in the scope of this disclosure. For example, functions included in each means, each step and the like can be rearranged not to be logically contradictory, and it is possible to combine or divide a plurality of means, steps and the like into one. The configurations described in the above examples and various modifications may be combined as appropriate.

The invention claimed is:

1. A conveyance system that conveys an article arranged by a user to a customer, comprising:
    a first conveyance unit that conveys the article arranged by the user;
    a second conveyance unit connected to the first conveyance unit and configured to convey the article conveyed from the first conveyance unit and, when the user newly arranges a new article, is capable of conveying the article;
    a third conveyance unit connected to the second conveyance unit and configured to convey the article conveyed by the second conveyance unit to the customer; and
    a control unit configured to perform conveyance control of each of the first conveyance unit, the second conveyance unit, and the third conveyance unit, and convey the article to the customer, wherein
    the first conveyance unit and the second conveyance unit are provided in a kitchen area, and
    the third conveyance unit is provided in an eating and drinking area.

2. The conveyance system according to claim 1, wherein both of the second conveyance unit and the third conveyance unit are provided in a plural form, and the first conveyance unit is configured to convey the arranged article to any one conveyance unit included in the second conveyance unit based on instruction information transmitted from the control unit.

3. The conveyance system according to claim 2, wherein the first conveyance unit is provided in a plural form, and conveys the arranged article to a different conveyance unit included in the second conveyance unit based on the instruction information transmitted from the control unit.

4. The conveyance system according to claim 1, further comprising an acquiring unit configured to acquire conveyance information on a conveyance location of the arranged article, wherein
the control unit is configured to control any one of the first conveyance unit, the second conveyance unit and the third conveyance unit based on the conveyance information.

5. The conveyance system according to claim 1, further comprising a guide unit configured to change a conveyance location of the conveyed article at a point where the first conveyance unit and the second conveyance unit are connected with each other based on the instruction information transmitted from the control unit.

6. The conveyance system according to claim 1, further comprising an input unit configured to receive input information of the article to be conveyed to the customer, wherein
the control unit is configured to control at least one of the first conveyance unit, the second conveyance unit and the third conveyance unit based on the input information.

7. The conveyance system according to claim 1, wherein the second conveyance unit is arranged between and separates the first conveyance unit and the third conveyance unit.

8. The conveyance system according to claim 7, wherein a conveyance direction of the first conveyance unit and a conveyance direction of the second and third conveyance units are different from each other.

9. The conveyance system according to claim 1, wherein each of the first conveyance unit, the second conveyance unit, and the third conveyance unit is any of a chain conveyor, an endless belt conveyor, and a roller conveyor.

10. A method of conveying an article arranged by a user to a customer, comprising:
 a first conveyance step of conveying an article arranged by a user;
 a second conveyance step wherein the article conveyed in the first conveyance step is conveyed or a new article arranged by the user is conveyed;
 a third conveyance step wherein the article conveyed in the second conveyance step is conveyed to the customer; and
 a control step wherein conveyance control of each of the first conveyance step, the second conveyance step, and the third conveyance step is performed to convey the article to the customer, wherein
the first conveyance step and the second conveyance step are performed in a kitchen area, and
the third conveyance step is performed in an eating and drinking area.

* * * * *